(12) United States Patent
Yang et al.

(10) Patent No.: US 10,615,683 B2
(45) Date of Patent: Apr. 7, 2020

(54) METHOD FOR CONTROLLING INVERTER

(71) Applicant: LSIS CO., LTD., Anyang-si, Gyeonggi-do (KR)

(72) Inventors: Chun-Suk Yang, Anyang-si (KR); Jae-Moon Lee, Anyang-si (KR); Jae-Sung Kim, Anyang-si (KR)

(73) Assignee: LSIS CO., LTD., Anyang-si, Gyeonggi-do (KR)

( * ) Notice: Subject to any disclaimer, the term of this patent is extended or adjusted under 35 U.S.C. 154(b) by 0 days.

(21) Appl. No.: 15/870,091

(22) Filed: Jan. 12, 2018

(65) Prior Publication Data

US 2018/0278148 A1 Sep. 27, 2018

(30) Foreign Application Priority Data

Mar. 24, 2017 (KR) ........................ 10-2017-0037334

(51) Int. Cl.
| | | |
|---|---|---|
| *H02M 1/32* | (2007.01) | |
| *H02P 23/08* | (2006.01) | |
| *H02M 1/08* | (2006.01) | |
| *H02M 5/458* | (2006.01) | |
| *H02M 7/5387* | (2007.01) | |
| *H02P 25/02* | (2016.01) | |
| *H02P 27/08* | (2006.01) | |
| *H02M 1/00* | (2006.01) | |

(52) U.S. Cl.
CPC ............. *H02M 1/32* (2013.01); *H02M 1/08* (2013.01); *H02M 5/4585* (2013.01); *H02M 7/53871* (2013.01); *H02P 23/08* (2013.01); *H02P 25/02* (2013.01); *H02P 27/08* (2013.01); *H02M 2001/0009* (2013.01)

(58) Field of Classification Search
CPC . H02M 1/32; H02M 7/00; H02H 1/00; H02H 6/00; H02H 7/00; H02H 9/00; H02H 11/00; H02P 23/08; H02P 25/08; H02P 27/08
See application file for complete search history.

(56) References Cited

U.S. PATENT DOCUMENTS

| | | | |
|---|---|---|---|
| 4,320,332 A | 3/1982 | Sugimoto | |
| 4,527,214 A * | 7/1985 | Hattori | ................. H02H 3/0935 361/24 |
| 5,703,459 A | 12/1997 | Yasohara et al. | |

(Continued)

FOREIGN PATENT DOCUMENTS

| | | |
|---|---|---|
| EP | 0833436 A2 | 4/1998 |
| JP | H01069281 A | 3/1989 |

(Continued)

OTHER PUBLICATIONS

European Search Report for related European Application No. 18151787.1; report dated Jun. 12, 2018; (8 pages).

(Continued)

*Primary Examiner* — Bickey Dhakal
*Assistant Examiner* — Said Bouziane
(74) *Attorney, Agent, or Firm* — K&L Gates LLP

(57) ABSTRACT

Disclosed is a method for controlling an inverter. The method includes detecting an output current from an inverter to determine a software over-current suppression (S/W OCS) level according to an output frequency of the output current.

4 Claims, 11 Drawing Sheets

(56) References Cited

U.S. PATENT DOCUMENTS

| | | | | |
|---|---|---|---|---|
| 5,883,489 A * | 3/1999 | Konrad | ............... | F04D 15/0066 |
| | | | | 318/805 |
| 7,042,193 B2 * | 5/2006 | Kinpara | .................. | H02P 21/00 |
| | | | | 318/801 |
| 2013/0286514 A1 * | 10/2013 | Oguchi | ................... | B60L 3/003 |
| | | | | 361/31 |
| 2016/0268950 A1 * | 9/2016 | Cho | ........................ | H02P 27/06 |

FOREIGN PATENT DOCUMENTS

| | | |
|---|---|---|
| JP | H0491698 A | 3/1992 |
| JP | 06284787 H | 10/1994 |
| JP | 2000201484 A | 7/2000 |
| JP | 2006050886 A | 2/2006 |
| JP | 5661352 B2 | 1/2015 |
| JP | 2015050779 A | 3/2015 |

OTHER PUBLICATIONS

Deng Jiangming, et al; "Variable slip-frequency strategy for reducing non-equal deviations output by paralleled single-sided linear induction motors"; vol. 9, No. 6; Sep. 2015; (10 pages).

\* cited by examiner

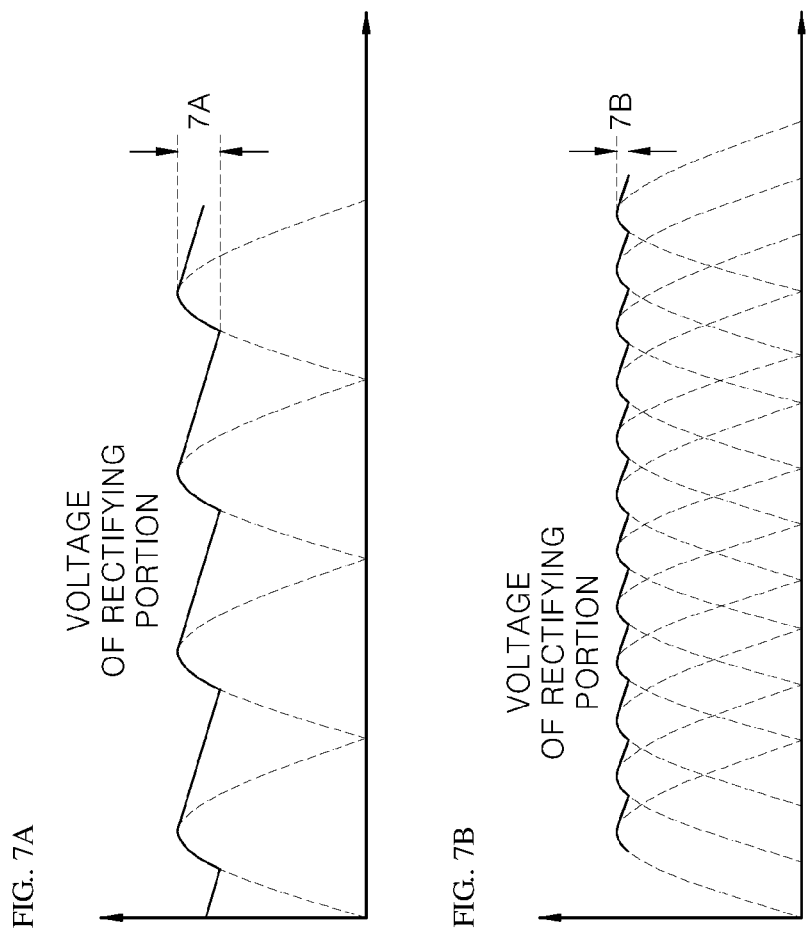

METHOD FOR CONTROLLING INVERTER

CROSS-REFERENCE TO RELATED APPLICATIONS

Pursuant to 35 U.S.C. § 119(a), this application claims the benefit of earlier filing date and right of priority to Korean Patent Application No. 10-2017-0037334 filed on Mar. 24, 2017, in the Korean Intellectual Property Office, the disclosure of which is hereby incorporated by reference in its entirety.

BACKGROUND

1. Technical Field

The present disclosure relates to a method for controlling an inverter.

2. Description of the Related Art

Generally, an inverter is a power converter which converts commercial alternating-current (AC) power into direct-current (DC) power and then converts the DC power into AC power suitable for a motor to supply AC power thereto. This inverter efficiently controls the motor to reduce power consumption thereof, thereby improving energy efficiency.

A slip frequency of the motor is defined as a difference between a reference frequency generated by the inverter and a rotational speed of the motor, and, when the slip frequency of the motor increases significantly, an over-current occurs and thus the inverter or the motor is burned out.

Generally, the inverter has a protection against the over-current, so that, when the over-current occurs, an inverter controller suppresses the over-current or generates a trip to protect the inverter or the motor.

However, in a conventional inverter control method of suppressing an over-current, a constant reference is applied irrespective of an output frequency, so that, when the output frequency is low, there is a problem in that overload performance cannot be obtained.

SUMMARY

Therefore, it is an objective of the present disclosure to provide a method for controlling an inverter, which maintains a software over-current suppression level as a constant in a high output frequency range and increases the software over-current suppression level in a low output frequency range to improve overload performance.

In accordance with one aspect of the present disclosure, there is provided a method for controlling an inverter configured to control a motor, the method including detecting an output current of the inverter; determining a software over-current suppression (S/W OCS) level according to an output frequency of the output current; and attenuating the output frequency when the output current of the inverter is greater than the S/W OCS level.

In one embodiment of the present disclosure, the determining of the S/W OCS level may include determining the S/W OCS level at a first rate of a rated current of the inverter when the output frequency of the output current is greater than a predetermined first frequency.

In one embodiment of the present disclosure, the determining of the S/W OCS level may include determining the S/W OCS level at a second rate greater than the first rate of the rated voltage of the inverter (2) when the output frequency of the output current is smaller than a second frequency that is smaller than the predetermined first frequency.

In one embodiment of the present disclosure, the determining of the S/W OCS level may include determining the S/W OCS level using a continuous function which linearly connects the first rate and the second rate when the output frequency of the output current is smaller than the predetermined first frequency and greater than the second frequency.

In one embodiment of the present disclosure, the determining of the S/W OCS level may include determining the S/W OCS level by modeling a function of the output frequency on the basis of an imbalance of the output current of the inverter.

In accordance with the present disclosure, there is an effect of improving overload performance by increasing a software over-current suppression (S/W OCS) level at a low output frequency.

BRIEF DESCRIPTION OF DRAWINGS

FIGS. 7A and 7B are exemplary diagrams for describing a magnitude of a ripple voltage according to input power.

DETAILED DESCRIPTION

Figure 1:
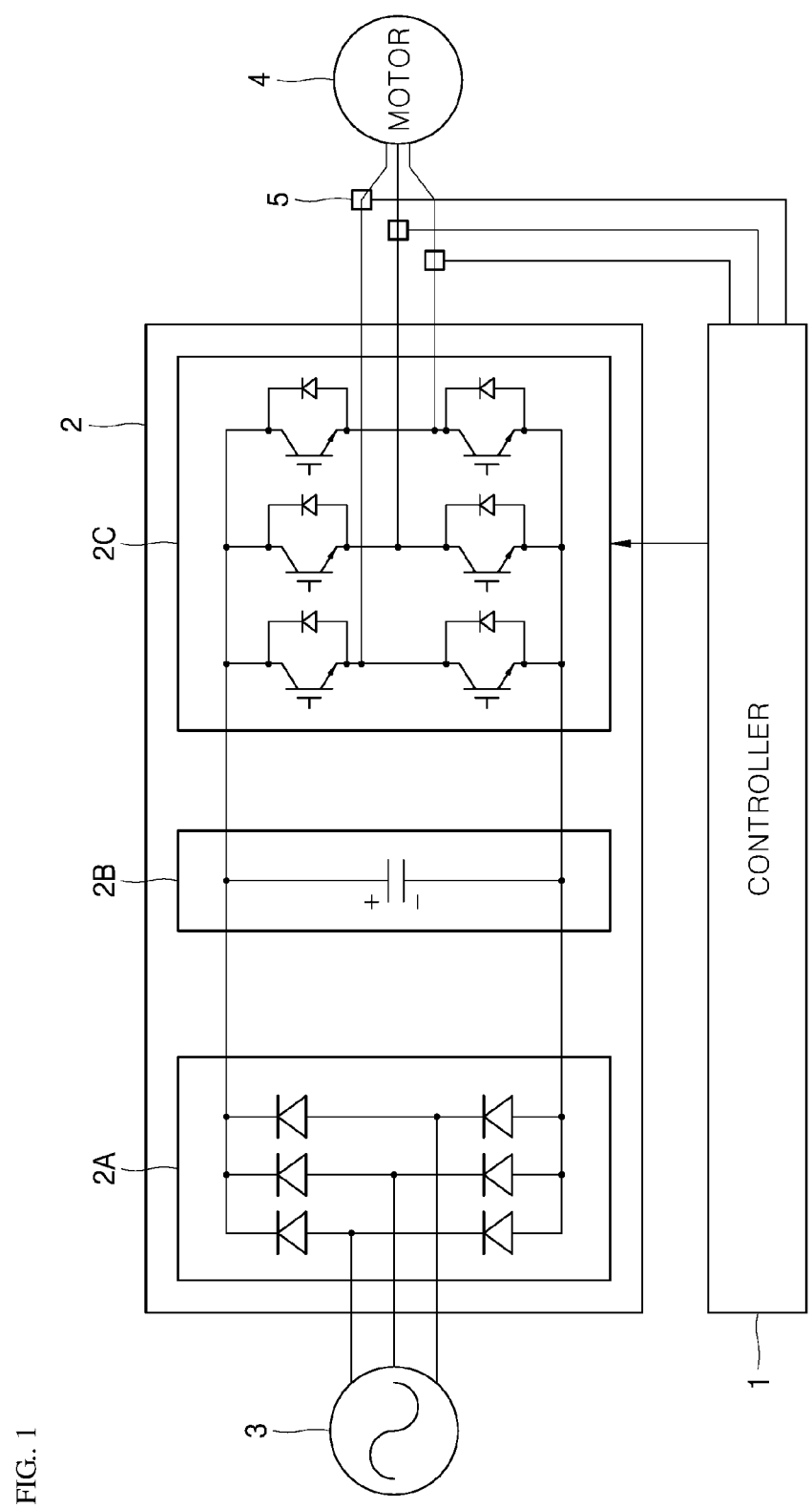
FIG. 1 is a schematic block diagram of an inverter system to which a method for controlling an inverter according to one embodiment of the present disclosure is applied.

The present disclosure may be modified in various forms and may have a variety of embodiments, and, therefore, specific embodiments will be illustrated in the drawings and a description thereof will be described in the following detailed description. The embodiments to be disclosed below, however, are not to be taken in a sense which limits the present disclosure to specific embodiments, and should be construed to include modification, equivalents, or substitutes within the spirit and technical scope of the present disclosure.

In order to fully convey a configuration and an effect of the present disclosure, preferred embodiments of the present disclosure will be described with reference to the accompanying drawings. However, the present disclosure is not limited to the embodiments described below, but may be implemented in various forms and various modifications may be made. However, the description of the present embodiment is intended to provide a complete disclosure of the present disclosure and to fully disclose the scope of the present disclosure to a person ordinary skilled in the art to which the present disclosure belongs. In the accompanying drawings, components are enlarged in size for convenience of description, and a scale of each of the components can be exaggerated or reduced.

When a component is described as being "on" or "in contact" with other component, the component may be in direct contact with or be connected to the other component, and it should be construed that another component may be present between the component and the other component. On the other hand, when a component is described as being "directly on" or "in direct contact" with other element, it may be understood that no another component is present between the component and the other component. Other expressions that describe the relationship between components, for example, "between" and "directly between" may be similarly interpreted as described above.

The terms "first," "second," and the like can be used to describe various components, but the components should not be limited by these terms. These terms may be used only for the purpose of distinguishing one component from another component. For example, without departing from the scope of the present disclosure, a first component may be referred to as a second component, and similarly, the second component may also be referred to as the first component.

The singular form includes the plural form unless the context clearly notes otherwise. In this description, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Unless otherwise defined, the terms used in the embodiments of the present disclosure may be construed as commonly known to those skilled in the art.

Hereinafter, preferred embodiments of the present disclosure will be described in detail with reference to the accompanying drawings.

FIG. 1 is a schematic block diagram of an inverter system to which a method for controlling an inverter according to one embodiment of the present disclosure is applied.

As shown in the drawing, a system to which a method for controlling an inverter according to one embodiment of the present disclosure is applied is characterized in that a three-phase power source 3 may be applied to an inverter 2 and an output of the inverter 2 may be applied to a motor 4, and, when a three-phase output current of the inverter 2 is detected by a detector 5 and is applied to a controller 1, a pulse width modulation (PWM) control signal may be output to an inverting portion 2C of the inverter 2.

When the inverter 2 receives alternating-current (AC) power from the three-phase power source 3, a rectifying portion 2A may convert an AC voltage into a direct-current (DC) voltage, a DC link capacitor 2B may store the DC voltage as a DC link voltage, and then the inverting portion 2C may convert the DC voltage into an AC voltage according to the PWM control signal of the controller 1 to output the AC voltage to the motor 4.

The PWM control signal output from the controller 1 controls ON/OFF operations of a plurality of switching elements of the inverting portion 2C, and thus the inverting portion 2C may output the AC voltage having a predetermined output frequency to the motor 4.

A slip frequency of the motor 4 is defined as a difference between a reference frequency generated at the inverter 2 and a rotational speed of the motor 4, and, when the slip frequency of the motor 4 increases significantly, an over-current occurs and thus the inverter 2 or the motor 4 is burned out. Generally, the inverter 2 has a protection against the over-current such that, when the over-current occurs, the controller 1 may suppress the over-current or generate a trip to protect the inverter 2 or the motor 4.

Hereinafter, a conventional method for controlling an inverter for an over-current protection will be described, and a method for controlling an inverter according to one embodiment of the present disclosure will be described.

Figure 2:
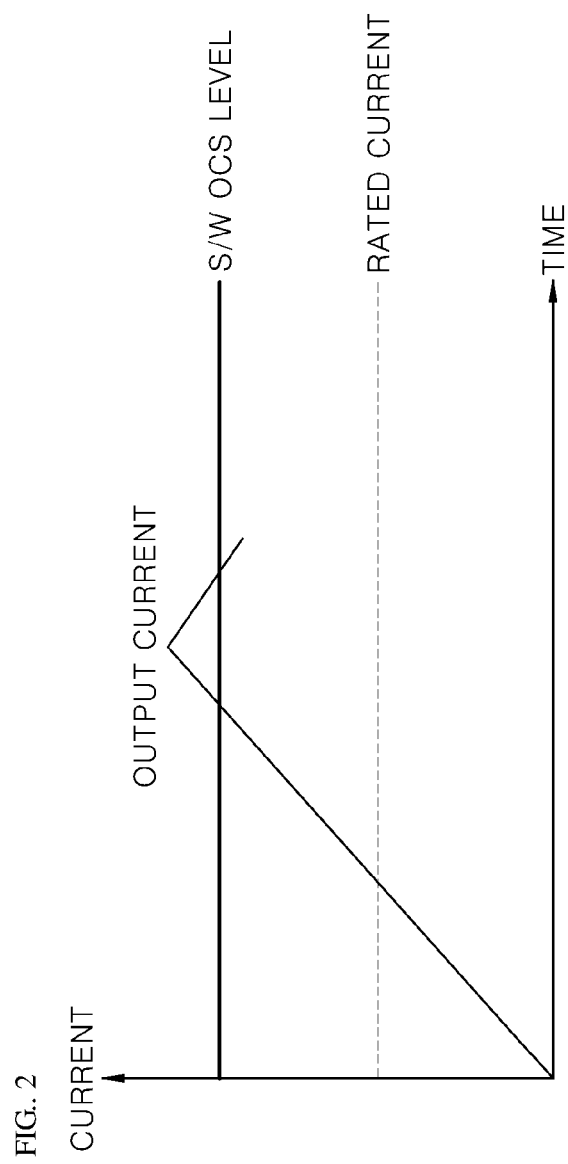
FIG. 2 illustrates a current level when an inverter control is performed for an over-current protection.
Figure 3:
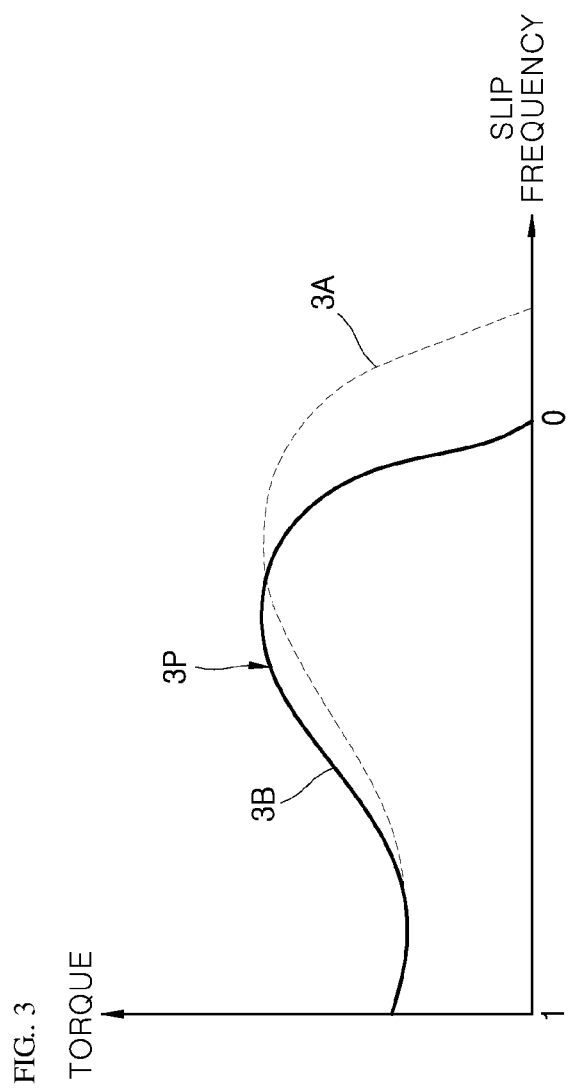
FIG. 3 is a graph for describing variation of a slip frequency and a torque due to reduction of an output frequency when a software over-current suppression (S/W OCS) operates.
Figure 4:
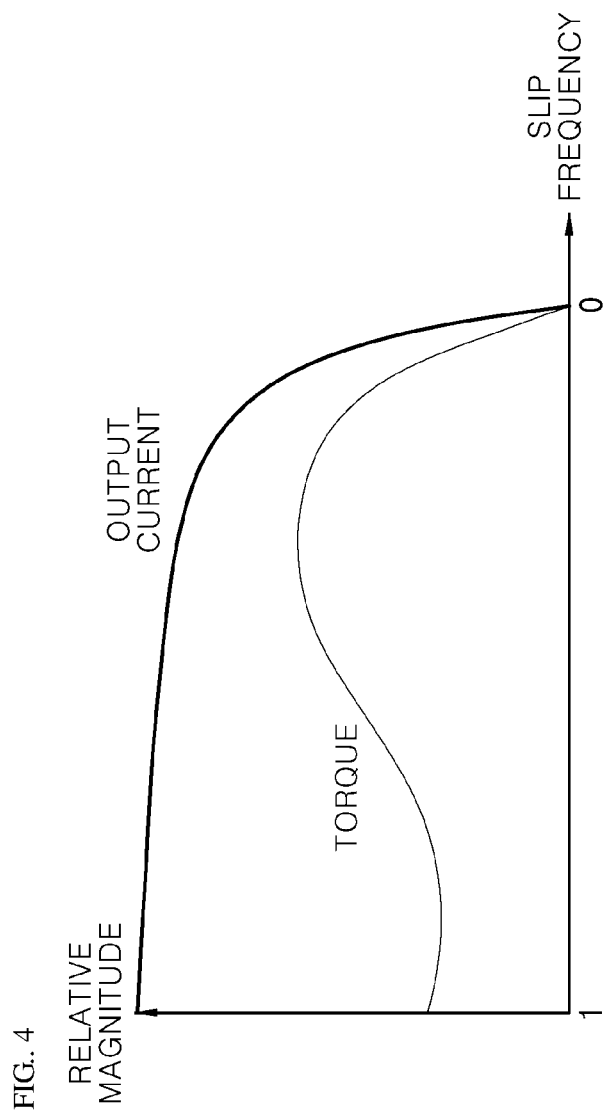
FIG. 4 is a graph for describing a relationship between a slip frequency, an output torque, and an input current of an induction motor.

FIG. 2 illustrates a current level when an inverter control is performed for an over-current protection, FIG. 3 is a graph for describing variation of a slip frequency and a torque due to reduction of an output frequency when a software over-current suppression (S/W OCS) operates, and FIG. 4 is a graph for describing a relationship between a slip frequency, an output torque, and an input current of an induction motor.

Referring to FIG. 2, an S/W OCS operation for controlling a slip frequency of the motor 4 is that the controller 1 monitors an output current of the inverter 2 and, when the output current of the inverter 2 increases over an S/W OCS level, the controller 1 attenuates an output frequency of the inverter 2 to reduce a slip frequency of the motor 4. The S/W OCS level is generally a fixed level over a rated current of the inverter 2.

The slip frequency of the motor 4 may be expressed as follows.

$$s = (N_s - N)/N_s \qquad \text{[Equation 1]}$$

where s denotes the slip frequency, $N_s$ denotes a synchronous speed, and N denotes a speed of the motor 4.

In FIG. 3, 3A represents a torque-slip curve of a conventional output frequency, and 3B represents a torque-slip curve of a reduced output frequency. Generally, the synchronous speed is directly proportional to the output frequency, so that, when the slip frequency decreases due to a decrease of the output frequency, an output torque temporarily increases at a point 3P such that the synchronous speed increases, and, when the output frequency returns to its original value, the slip frequency decreases compared to a previous slip frequency. As can be seen from FIG. 4, when the slip frequency decreases, a magnitude of an output current decreases.

The purpose of the S/W OCS operation is to prevent thermal damage of the inverter 2 or the motor 4 due to an over-current. Heat generation in the motor 4 due to a current is proportional to an output of the motor 4, and the output of the motor 4 is proportional to the product of a torque and an output frequency.

Meanwhile, when the output frequency is close to an input voltage frequency, an effect of a voltage ripple, which is generated during rectification of an input voltage by the rectifying portion 2A, on the magnitude of each of the three-phase output voltages is different. In this case, one phase of output currents becomes larger than a current detected by the detector 5 due to an imbalance, so that a local over-current may occur at the one phase.

Figure 5:
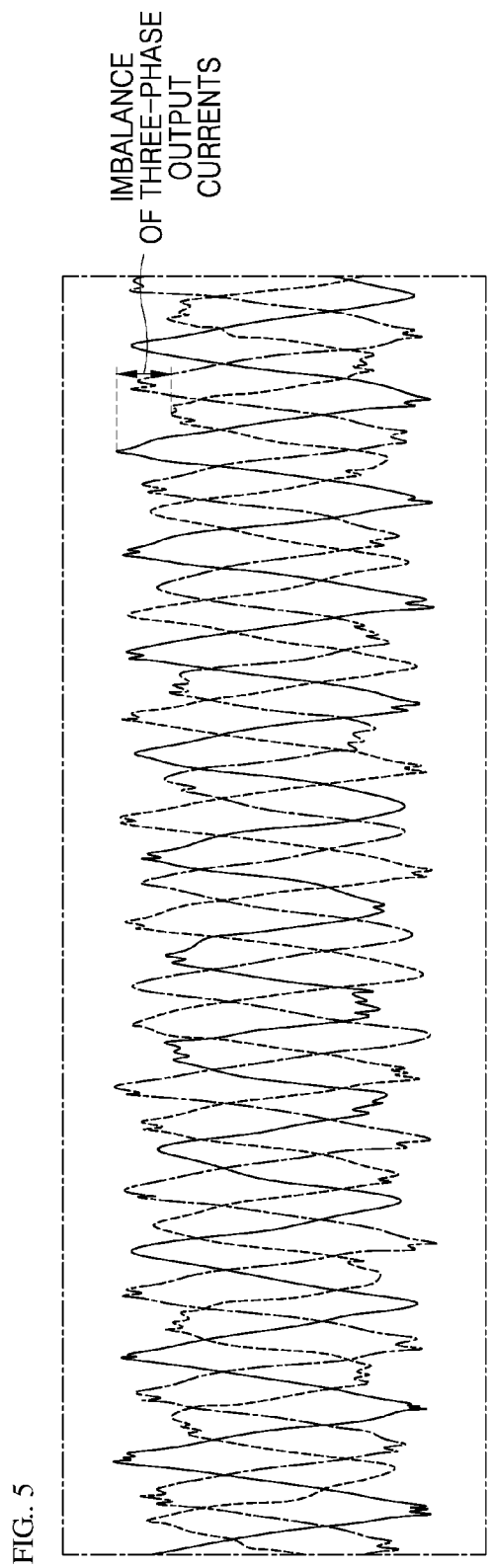
FIG. 5 is a waveform diagram for describing an output current imbalance in a single-phase input type inverter.

FIG. 5 is a waveform diagram for describing an output current imbalance in a single-phase input type inverter. In FIG. 5, 5A represents an imbalance of a three-phase output current.

The inverter may output a large current without thermal damage even when an output frequency is low, so that overload performance may be obtained. However, when the S/W OCS operation is based on a constant S/W OCS level regardless of the output frequency as in the prior art, a large current cannot be output when the output frequency is low, so that the overload performance may not be obtained in a low frequency band.

When the output frequency increases, the imbalance between the three-phase output currents due to a ripple of the rectifying portion tends to increase. In the case of an inverter using a single-phase input current, the imbalance more tends to increase when the three-phase output currents are used, and a voltage ripple occurs twice the input frequency so that, when the output frequency approaches the input frequency, a peak output of one phase of the output currents may be synchronized with the high and low points of a voltage of the rectifying portion by the voltage ripple.

Figure 6A:
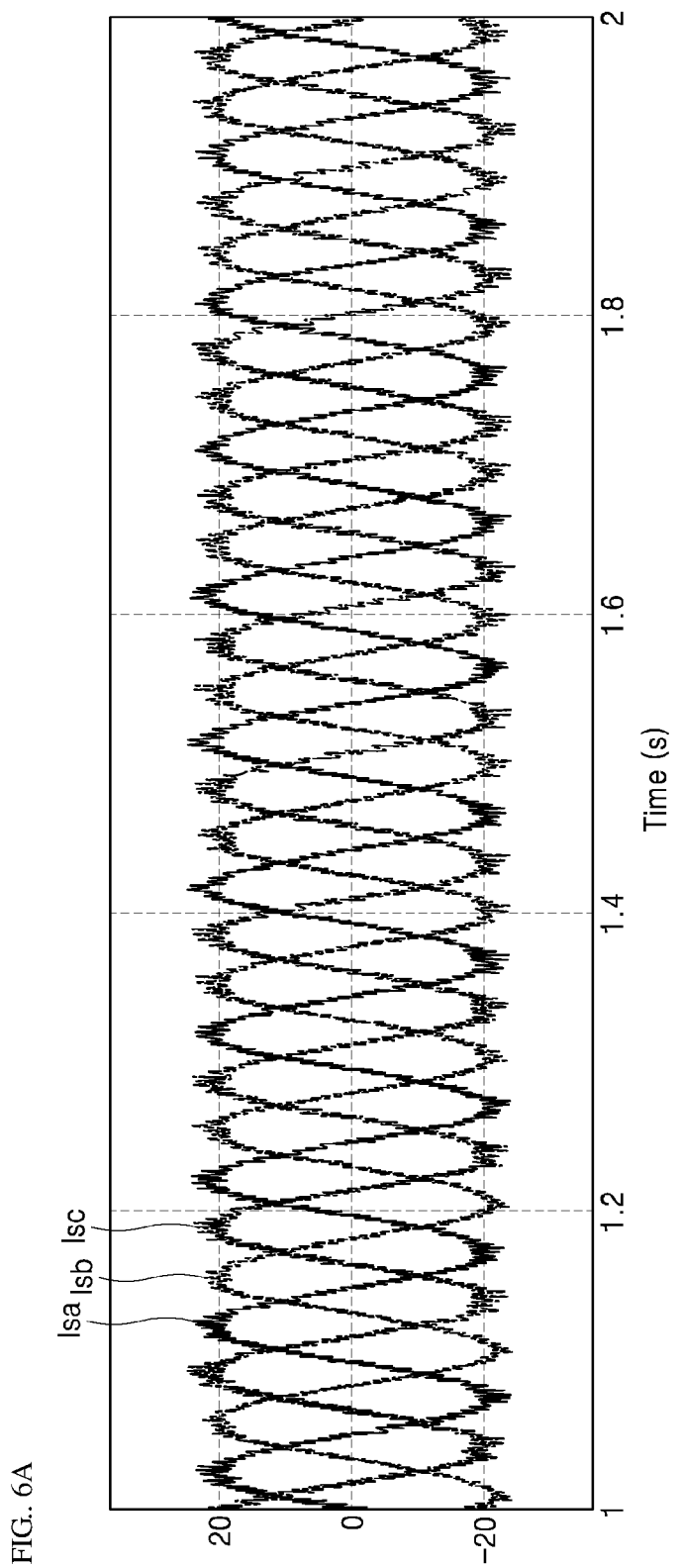
FIGS. 6A and 6B are exemplary diagrams for describing an output current imbalance according to an output frequency.
Figure 6B:
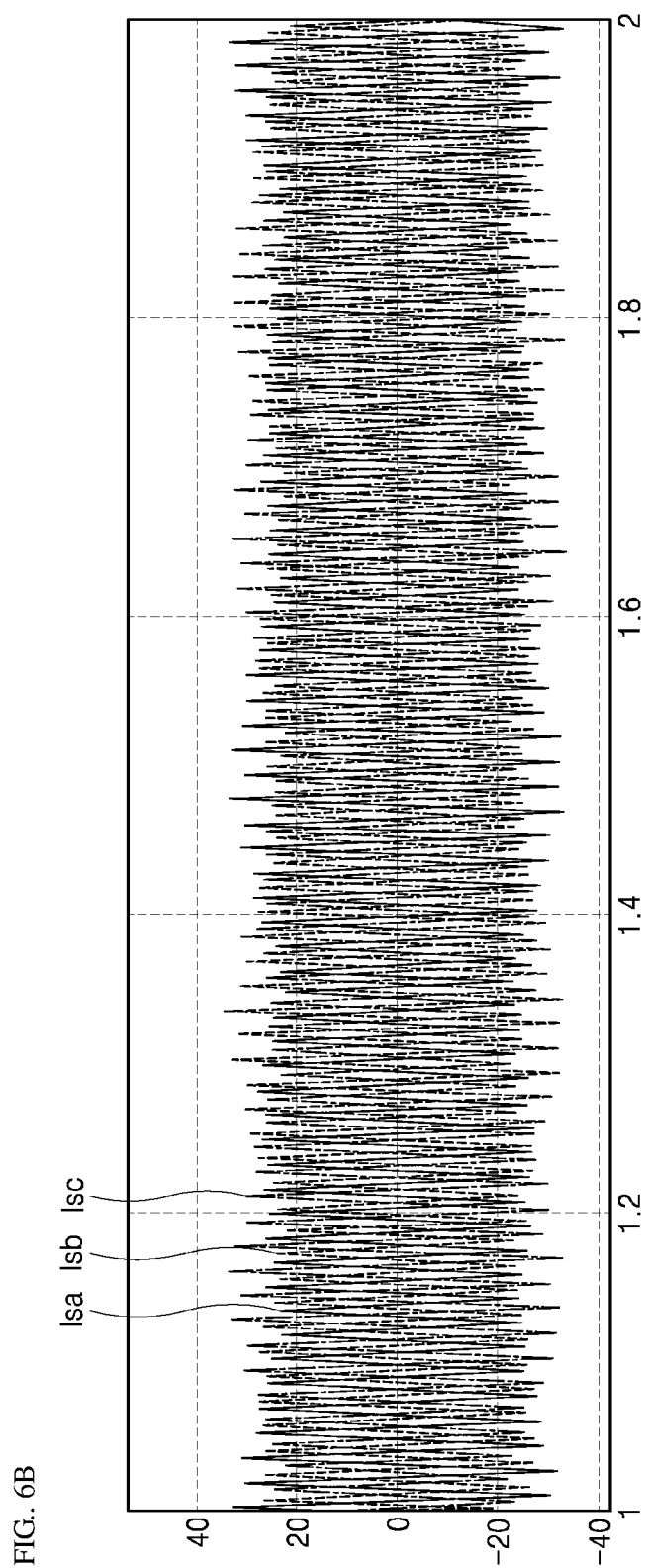

FIGS. 6A and 6B are exemplary diagrams for describing the output current imbalance according to the output frequency, FIG. 6A illustrates an output current waveform in a single-phase input type inverter when the output frequency is 10 Hz, and FIG. 6B illustrates an output current waveform in a single-phase input type inverter when the output frequency is 60 Hz. As shown in the drawings, when the output frequency is high, the imbalance of the output current becomes large. Therefore, the risk of thermal damage increases due to the output current imbalance.

Further, a voltage ripple becomes larger in the case of rectifying single-phase input power, than in the case of rectifying the three-phase input power, so that an imbalance between phases is worsened.

FIGS. 7A and 7B are exemplary diagrams for describing a magnitude of a voltage ripple according to an input voltage, FIG. 7A illustrates a DC link voltage of the single-phase input type inverter, and FIG. 7B illustrates a DC link voltage of a three-phase input type inverter. As shown in the drawings, it can be seen that a magnitude 7A of a voltage ripple voltage at the DC link voltage of the single-phase input type inverter is larger than a magnitude 7B of a voltage ripple at the DC link voltage of the three-phase input type inverter.

Therefore, in the case of a phase in which an imbalance occurs in a direction in which a magnitude of the output current is large, thermal damage is likely to occur in a power semiconductor, an electric wire, a winding of a motor, and the like due to an over-current when compared to other phases, so that an S/W OCS level should be kept low in proportion to the imbalance. On the other hand, when the output frequency is relatively low, a frequency of the voltage ripple becomes several times larger than the output frequency, and thus the imbalance due to synchronization between the output phase and the voltage is relatively small. Further, when the output torque is constant, the output decreases relatively due to a decrease of the output frequency, so that possibility of thermal damage due to the over-current is reduced.

In conclusion, when over-current suppression is performed using a constant reference regardless of the output frequency, a protection function for a high output frequency is secured, but, when the output frequency is low, this level is unnecessarily high and thus there is a problem in that overload performance may not be obtained. Due to a characteristic of an induction motor, when the induction motor is activated, that is, when the output frequency is low, a large torque and a large output current are required, it is inappropriate to lower low frequency output overload performance.

Therefore, the method for controlling an inverter according to the present disclosure may improve overload performance by maintaining a software over-current suppression level to a constant in a section in which the output frequency is high and increasing the software over-current suppression level in a section in which the output frequency is low.

Figure 8:
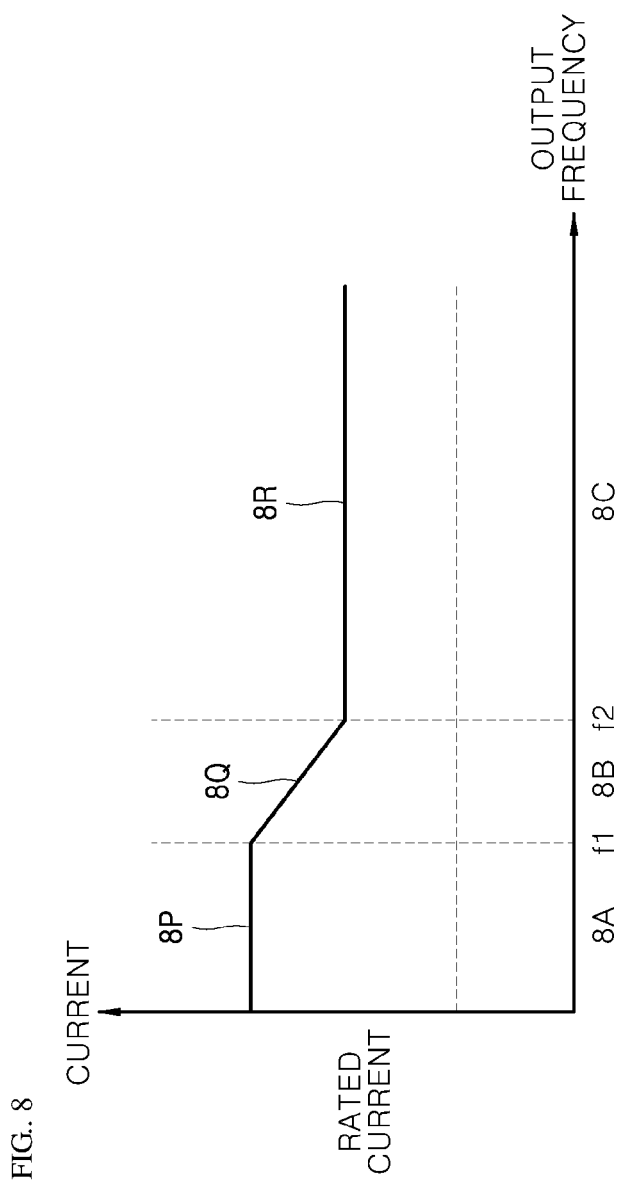
FIG. 8 is an exemplary diagram for describing a process of controlling an S/W OCS operation according to one embodiment of the present disclosure.

FIG. 8 is an exemplary diagram for describing a process of controlling an S/W OCS operation according to one embodiment of the present disclosure.

As shown in the drawing, the method for controlling an inverter according to one embodiment of the present disclosure may vary an S/W OCS level by dividing an output frequency of the output current of the inverter 2 into three sections.

That is, in a section 8C in which an output frequency is relatively high (i.e., when the output frequency is larger than f2), there is a possibility that a local over-current occurs due to an imbalance between output phases due to a voltage ripple of a DC link voltage, and an output of the motor 4 increases due to a high output frequency and thus an amount of generated heat increases. Therefore, in the section 8C, over-current protection performance may be secured by lowering and setting the S/W OCS level 8R to a constant. At this point, the S/W OCS level 8R in the section 8C may be the same as a conventional S/W OCS level and may be about 160% of a rated current. However, this is merely illustrative, and the present disclosure is not limited thereto.

Further, in a section 8A in which the output frequency is lowest (i.e., when the output frequency is smaller than f1), the possibility of the local over-current due to the imbalance is reduced, and since the output of the motor 4 is also low due to the low output frequency, a S/W OCS level 8P is increased such that even larger output currents may be output without an operation of a protection function. That is, the S/W OCS level 8P in the section 8A may be larger than the conventional S/W OCS level, for example, about 180% of the rated current. However, this is merely illustrative, and the present disclosure is not limited thereto. Through this, the overload function may be improved when the output frequency is low.

Meanwhile, in a section 8B in which the output frequency is intermediate (that is, when the output frequency is larger than f1 and smaller than f2), a S/W OCS level 8Q may be linearly reduced to become a continuous function. That is, the S/W OCS level 8Q may be set to linearly decrease from the S/W OCS level 8P in the section 8A to the S/W OCS level 8R in the section 8C. This is because, when the S/W OCS level is not a continuous function, a discontinuous change in the S/W OCS level may cause a sudden current suppression operation for the same magnitude of the output current when the output frequency varies finely at a boundary between the sections.

Figure 9:
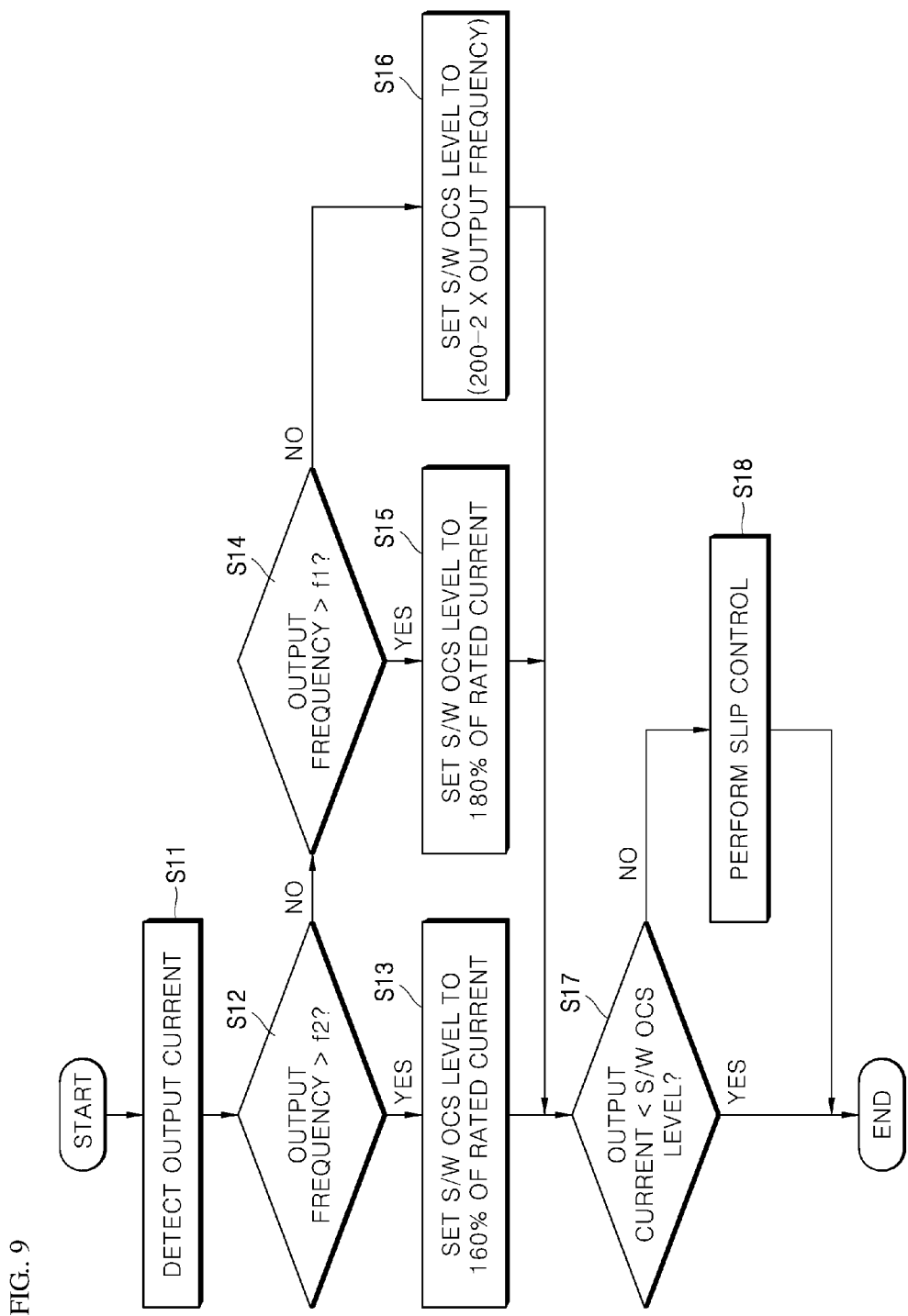
FIG. 9 is an exemplary flowchart for describing a method for controlling an inverter according to one embodiment of the present disclosure.

FIG. 9 is an exemplary flowchart for describing a method for controlling an inverter according to one embodiment of the present disclosure.

As shown in the drawing, in the method for controlling an inverter according to one embodiment of the present disclosure, the controller 1 receives an output current from the detector 5 (S11) and determines an output frequency of the output current.

Thereafter, when the output frequency is larger than the predetermined value f2 (S12), the controller 1 may set a S/W OCS level to 160% of a rated current (S13). However, this is merely illustrative, the present disclosure is not limited thereto, and the S/W OCS level may be set to a level higher than the rated current. At this point, f2 may be, for example, 20 Hz, but the present disclosure is not limited thereto.

When the output frequency is smaller than f2 in (S12), the controller 1 may determine whether the output frequency is smaller than f1 which is smaller than f2 (S14). When the output frequency is smaller than f1, the controller 1 may set the S/W OCS level to 180% of the rated current (S15). However, this is merely illustrative, the present disclosure is not limited thereto, and the S/W OCS level may be set to a level higher than the S/W OCS level which is set in (S13). At this point, f1 may be, for example, 10 Hz, but the present disclosure is not limited thereto.

When the output frequency is larger than f1 in (S14), the controller 1 may set the S/W OCS level to (200-2× output frequency) (S16). In this case, as described above, 160% and 180% of the rated current are linearly connected. Therefore, the present disclosure is not limited to the above-described example, and a determination equation may be changed as the level in each section is linearly connected.

Thereafter, the controller 1 monitors whether the output current detected by the detector 5 is larger than the S/W OCS level which is set as described above, and, when the output current becomes larger than the S/W OCS level (S17), the controller 1 may perform slip control (S18). That is, controller 1 may reduce a slip frequency of the motor 4 by attenuating the output frequency of the inverter 2.

As described above, the present disclosure can improve the overload performance by increasing the S/W OCS level from a level at a low output frequency.

An increase of the S/W OCS level from the level at a low output frequency does not adversely affect the protection function for the following reasons:

First, the frequency of the voltage ripple is higher than that of the output at a corresponding level, and thus the imbalance between the output phases is reduced such that a need for lowering a reference current is reduced in consideration of a case in which an over-current flowing in one phase becomes larger than the detected voltage due to the imbalance.

Second, since the output frequency is low at the corresponding level, the output which is the product of the output frequency and the torque becomes low as a result, so that heat generation of the electric wire decreases such that the need for lowering the reference current is lowered.

In the present disclosure, when a possibility of thermal damage due to the over-current increases in the motor 4 and the inverter 2 due to a high output frequency, a low S/W OCS level is applied such that performance of the over-current suppression operation may not be restricted.

Figure 10:
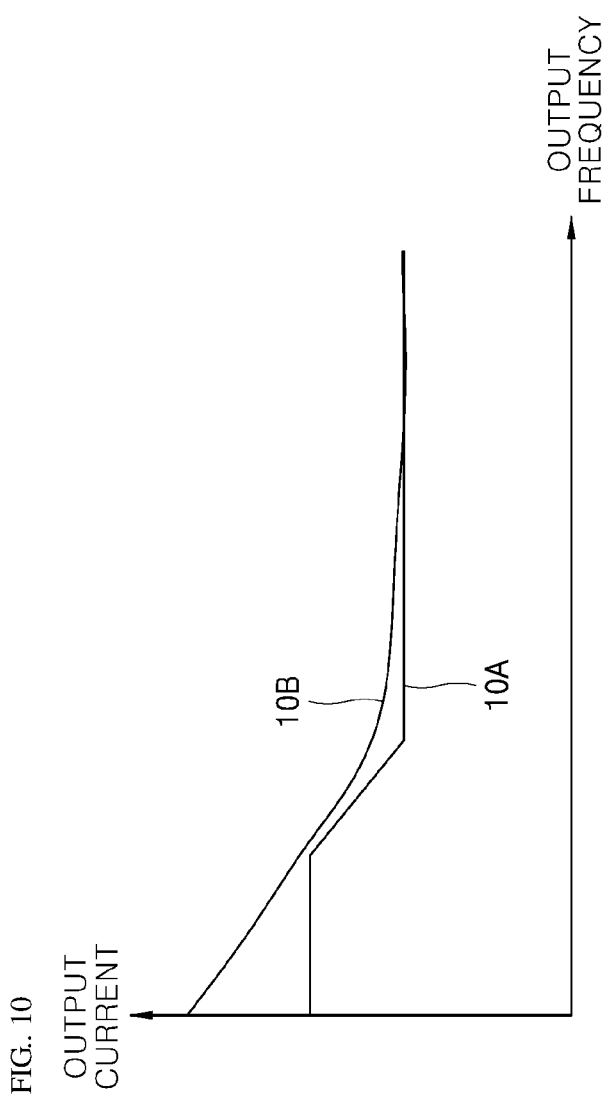
FIG. 10 is an exemplary diagram for describing a process of controlling an S/W OCS operation according to another embodiment of the present disclosure.

FIG. 10 is an exemplary diagram for describing a process of controlling an S/W OCS operation according to another embodiment of the present disclosure.

In the embodiment of FIG. 8, the section of the output frequency is divided into three sections, the S/W OCS level is kept constant in the low frequency band and the high frequency band, and the S/W OCS level is set to linearly decrease as the frequency increases in an intermediate frequency band, but in one embodiment of FIG. 10, the controller 1 may model the S/W OCS level to a level 10B as a function of the output frequency using an imbalance of the output current and an amount of generated heat of the electric wire in the inverter 2.

Therefore, it is possible to derive a function for outputting an ideal reference current using a required thermal characteristic and a required output frequency.

Accordingly, the method for controlling an inverter according to the present disclosure can improve the overload performance by maintaining the S/W OCS level in a section in which the output frequency is high and increasing the S/W OCS level in a section in which the output frequency is low.

While the present disclosure has been described with reference to embodiments thereof, the embodiments are merely illustrative, and it should be understood that various modifications and equivalent embodiments can be derived by those skilled in the art. Accordingly, the true technical scope of the present disclosure should be determined by the appended claims.

What is claimed is:

1. A method for controlling an inverter for controlling a motor, comprising:
   detecting three-phase output currents from the inverter;
   determining an over-current suppression (OCS) level according to an output frequency of the three-phase output currents; and
   attenuating the output frequency if the three-phase output currents of the inverter is greater than the OCS level,
   wherein the determining of the OCS level includes determining the OCS level by modeling a function of the output frequency on the basis of an imbalance between the three-phase output currents of the inverter, which is caused by a voltage ripple.

2. The method of claim 1, wherein the determining of the OCS level includes determining the OCS level at a first rate of a rated current of the inverter when the output frequency of the output current is greater than a predetermined first frequency.

3. The method of claim 2, wherein the determining of the OCS level includes determining the OCS level at a second rate greater than the first rate of the rated voltage of the inverter when the output frequency of the output current is smaller than a second frequency that is smaller than the predetermined first frequency.

4. The method of claim 3, wherein the determining of the OCS level includes determining the OCS level using a continuous function which linearly connects the first rate and the second rate when the output frequency of the output current is smaller than the predetermined first frequency and greater than the second frequency.

* * * * *